United States Patent [19]

Marek

[11] Patent Number: 4,887,066

[45] Date of Patent: Dec. 12, 1989

[54] CAPACITIVE OBSTACLE DETECTOR FOR VEHICLES IN REVERSE GEAR

[75] Inventor: Jiri Marek, Baden, Austria

[73] Assignee: Setec Messgeräte Gesellschaft m.b.H., Vienna, Austria

[21] Appl. No.: 61,333

[22] Filed: Jun. 11, 1987

[30] Foreign Application Priority Data

Jun. 11, 1986 [AT] Austria .................................. 1581/86

[51] Int. Cl.⁴ ........................................... G08B 13/26
[52] U.S. Cl. .................................... 340/436; 340/562;
180/167; 324/457; 361/181
[58] Field of Search ...................... 340/404, 52 H, 561,
340/562, 563, 70, 901, 903, 555, 556, 554, 552,
557, 941, 933, 436, 437; 180/167; 361/179, 180;
330/9; 324/61 R, 457, 60 R, 60 C

[56] References Cited

U.S. PATENT DOCUMENTS

| | | | |
|---|---|---|---|
| 3,183,411 | 5/1965 | Palfi | 361/181 |
| 3,750,126 | 7/1973 | Solomon | 361/181 |
| 4,232,286 | 11/1980 | Voll | 340/901 |
| 4,278,962 | 7/1981 | Lin | 340/52 H |
| 4,300,116 | 11/1981 | Stahovec | 340/562 |
| 4,352,090 | 9/1982 | Omaha | 340/563 |
| 4,439,693 | 3/1984 | Lucas et al. | 330/9 |
| 4,467,313 | 8/1984 | Yoshino et al. | 340/904 |
| 4,528,563 | 7/1985 | Takeuchi | 367/116 |
| 4,716,371 | 12/1987 | Blitshteyn et al. | 324/457 |

FOREIGN PATENT DOCUMENTS 1808169 6/1970 Fed. Rep. of Germany .... 324/61 R
0115384 7/1983 Japan .................................. 340/52 H Primary Examiner—Joseph A. Orsino
Assistant Examiner—Jill D. Jackson
Attorney, Agent, or Firm—Thomas A. Vigil

[57] ABSTRACT

The capacitive proximity sensor for motor vehicles comprises a capacitance-measuring device for measuring the capacitance between at least one capacitor plate (1) which is fixed to the motor vehicle, on the one hand, and the environment, on the other hand, and an indicator for receiving the output signal of the measuring device.

To provide a proximity sensor in which the disturbing and parasitary capacitances occurring in practice are particularly taken into account, the output signal $S_c$ of the capacitance-measuring device (5) is delivered to an amplifier (6), which is provided with a degenerative feedback loop (9) comprising a storage device (11) and a switch (10) so that the output signal ($s_A$) of the amplifier (6) is held constant during normal travel, and the switch (10) is opened to interrupt the degenerative feedback loop (9) for a measurement. The switch is closed when the measurement has been completed.

6 Claims, 4 Drawing Sheets

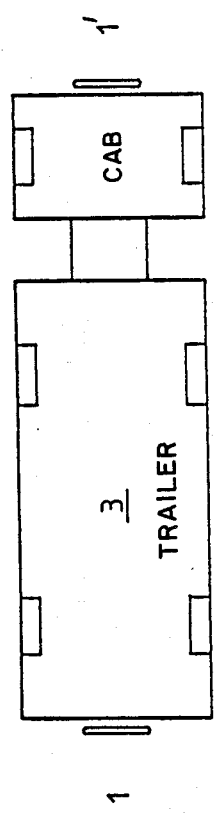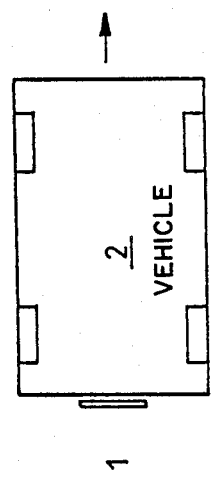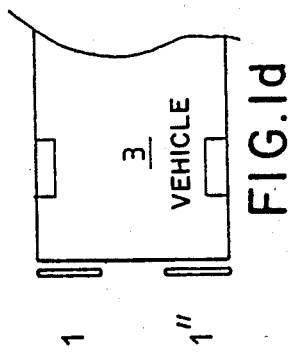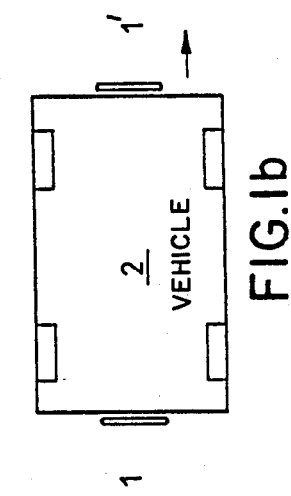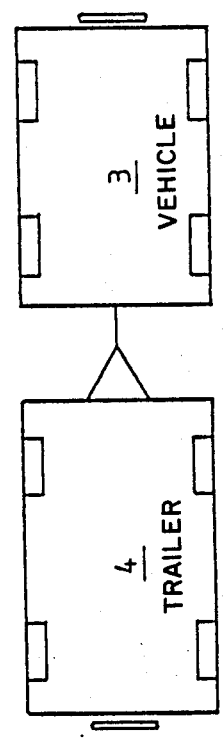

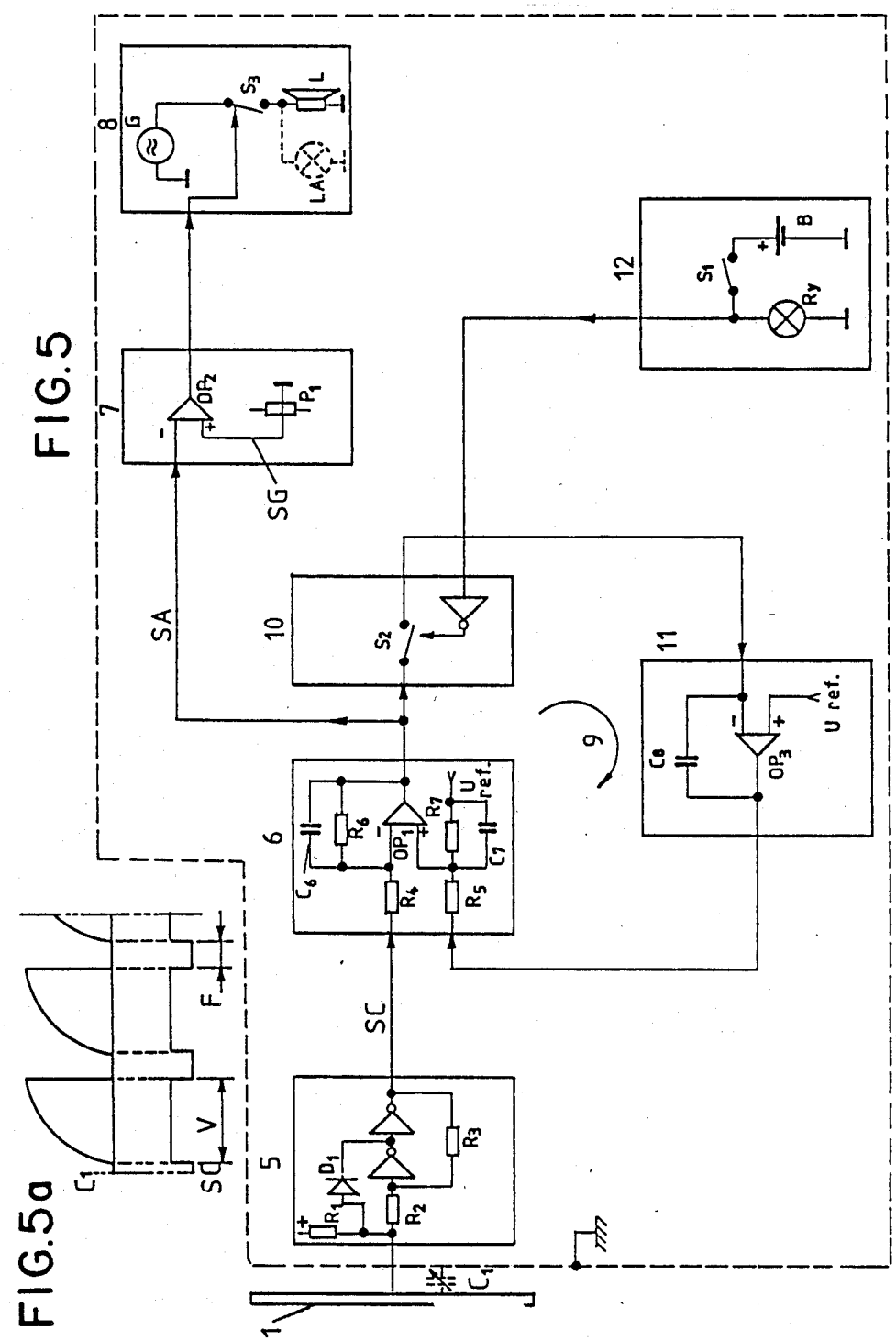

CAPACITIVE OBSTACLE DETECTOR FOR VEHICLES IN REVERSE GEAR

BACKGROUND AND SUMMARY OF THE INVENTION

This invention relates to a method of measuring and indicating the distance from a motor vehicle to an obstacle by a measurement of the capacitance existing between a capacitor plate which is fixed to the vehicle, on the one hand, and the environment, on the other hand, by a capacitance-measuring device, and also relates to a capacitive proximity sensor for motor vehicles, which sensor comprises a capacitance-measuring device for measuring the capacitance existing between at least one capacitor plate which is fixed to the motor vehicle, on the on hand, and the environment, on the other hand, and an indicator for receiving the output signal from the measuring device.

Such a proximity sensor has been described in Published German Application 2,044,790 and comprises a bridge circuit for eliminating disturbing or parasitic capacitance. Whereas certain a.c. bridge circuits can be used to eliminate even large disturbing capacitances, such a bridge circuit will be quickly and highly detuned by changes of the impedances of the branches of the bridge so that the bridge circuit is ultimately out of the range in which a compensation is possible. It must be particularly be taken into account that motor vehicles are subjected to continually changing influences from the environment and that the capacitance existing between the motor vehicle and ground will depend on the load on the vehicle. Said changes often exceed by an order of magnitude those capacitance changes which are to be measured at the capacitor plate. Parasitic resistances occur too and are continually changed. This may be due, e.g., to the influence of salt water in winter. In general, it has been found that the known bridge circuit can compensate the parasitic capacitance of a shielded line which connects the pick-up to the bridge but the continually changing resistances and capacitances outside the motor vehicle are not taken into account by that bridge circuit.

It is an object of the invention to provide a measuring method and a capacitive proximity sensor by which the disturbing parasitic capacitances occurring in practice are effectively taken into account.

In a method of the kind described first hereinbefore that object can be accomplished in accordance with the invention in that the output voltage of the capacitance-measuring device is delivered to an amplifier, which contains a degenerative feedback loop comprising a storage device and a switch so that the output signal of the amplifier is held constant during normal travel, and that the switch is opened to interrupt the degenerative feedback loop for a measurement and the switch is closed when the measurement has been completed.

The object stated is also accomplished by a provision of a proximity sensor which is of the kind described hereinbefore and in which the fixed capacitor plate consists of a plate member, particularly of a number plate, which is mounted on the body of the vehicle, or the capacitor plate is constituted by an electrically conductive layer provided on the front or rear surface of such plate member, the measuring device comprises a degenerative feedback control loop, a storage device is provided for storing the instantaneous degenerative feedback signal (deviation), and the control loop is adapted to be interrupted by a switch which is operable by the driver directly or indirectly, e.g., when the reverse gear is to be engaged.

The invention is based on the concept that the capacitor plate is constituted by a plate member, preferably by the number plate, the output of the measuring device is usually automatically held at a predetermined value by means of a degenerative feedback loop, and the last deviation corresponding to the degenerative feedback signal is stored. The control loop is interrupted by means of a switch only when the proximity sensor is actually to be used, e.g., when the reverse gear is to be engaged because the vehicle is to be parked. Deviations of the capacitance from the last value that has been measured will now be detected. Such deviations may be read directly from a measuring instrument or may be delivered to a limit comparator. When the vehicle has been parked, the switch is actuated to complete the control loop.

The method in accordance with the invention must not be confused with the balancing of a bridge such as has been mentioned in the fifth paragraph on page 4 of Published German Application 27 37 110. Such a balancing for a compensation of ambient capacitances, for instance, cannot be compared to a degenerative feedback control with storage of the last measured value.

In accordance with a desirable further feature of the invention the indicator comprises a limit comparator for receiving the output signal of the measuring device.

The invention and further advantages and features thereof will now be explained with reference to illustrative embodiments shown in the drawings.

BRIEF DESCRIPTION OF THE DRAWINGS

FIGS. 1a–1e are diagrammatic top plan views of a capacitor plate or plates on a motor vehicle and show various possible arrangements of one or two plates on a motor vehicle.

FIG. 5 is a more detailed circuit diagram of the electronic circuitry of the proximity sensor shown in FIG. 2, and FIG. 5a is a graph showing two signal waveforms.

DESCRIPTION OF THE PREFERRED EMBODIMENTS

Figure 2:
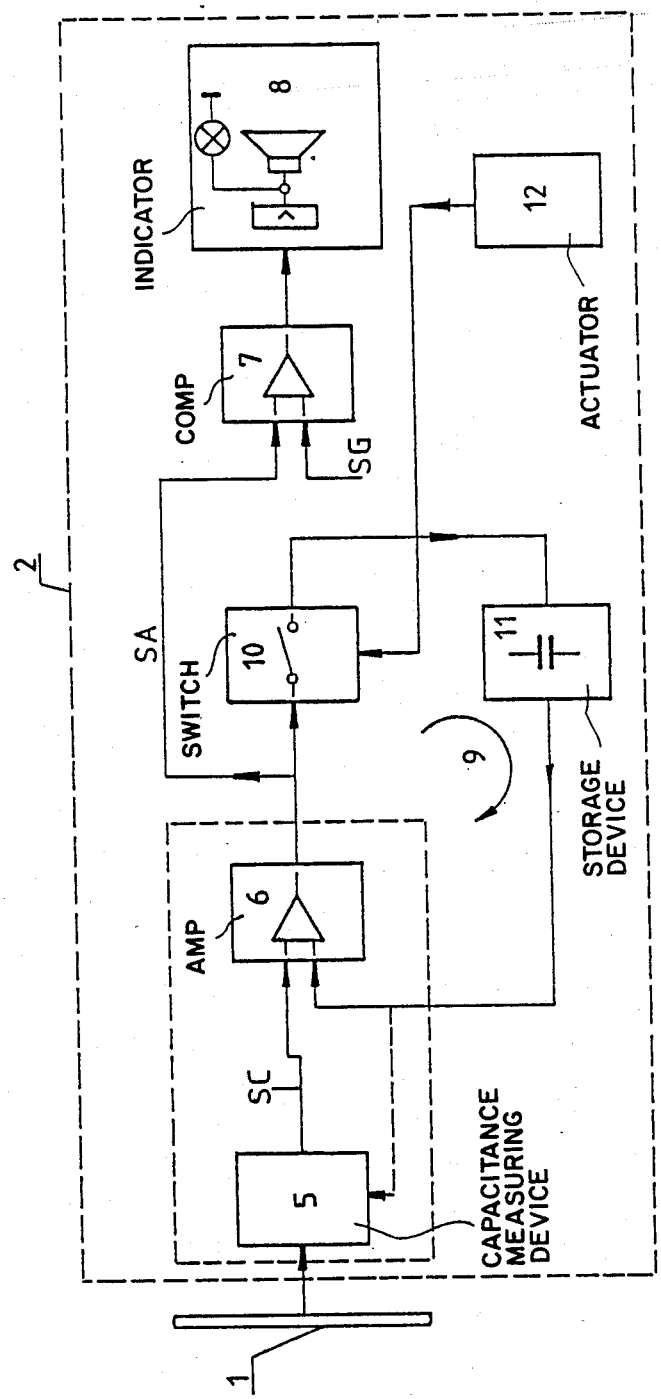
FIG. 2 is a block circuit diagram of the electronic circuitry of the proximity sensor of the present invention.

With reference to FIG. 1a the proximity sensor in accordance with the invention comprises a capacitor plate 1 that is mounted at the rear end of a motor vehicle 2. The capacitor plate 1 is desirably constituted by the rear number plate, which is insulated from the body of the vehicle. FIG. 1b shows two capacitor plates 1 and 1', which are respectively mounted on the front and rear ends of a motor vehicle 2. FIG. 1c shows two capacitor plates 1 and 1, which are respectively mounted at the rear end of a trailer 4 and at the front end of a truck 3.

A capacitor plate need not be constituted by a number plate but may be constituted by a different plate member, e.g., by an advertising sign or the like. Alternatively, the capacitor plate may be constituted by a thin conductive surface coating on the rear or front surface of a plate member. In the latter case that coating should be transparent or translucent.

From the block circuit diagram of FIG. 2 it is apparent that the capacitor plate 1 is connected to the input terminal of a capacitance-measuring device 5. That measuring device 5 may consist of any desired capacitance-measuring device that is known in the art and delivers an output pick-up signal ($s_c$ (e.g., a voltage or current), which is a function of the capacitance which is measured between the capacitor plate 1 and the environment (ground).

The output signal $s_c$ is received by an input terminal of an amplifier 6, which delivers from its output terminal a signal $s_A$ to one input terminal of a comparator 7. A fixed limit signal $s_G$ is delivered to the other input terminal of that comparator 7. The output of the comparator is delivered to an indicator 8, which is adapted to generate a signal, which may consist, e.g., of a visual or audible signal.

The output signal $s_A$ of the amplifier 6 is fed back by a degenerative feedback loop 9 to a second input terminal of the amplifier 6. The loop 9 contains a switch 10 and a storage device 11. The switch 10 is directly or indirectly operable by an actuating member 12, which may consist, e.g., of a switch that is associated with the reverse gear or may consist of a separate switch mounted on the instrument panel. The degenerative coupling effected by the loop 9 has a unit degenerative feedback gain so that the output signal $s_A$ is held at a constant value regardless of the pick-up signal $s_c$ when the switch 10 is closed. It has been indicated in FIG. 2 by dotted lines that the degenerative feedback may act also on the measuring device 5, if required.

Figure 3B:
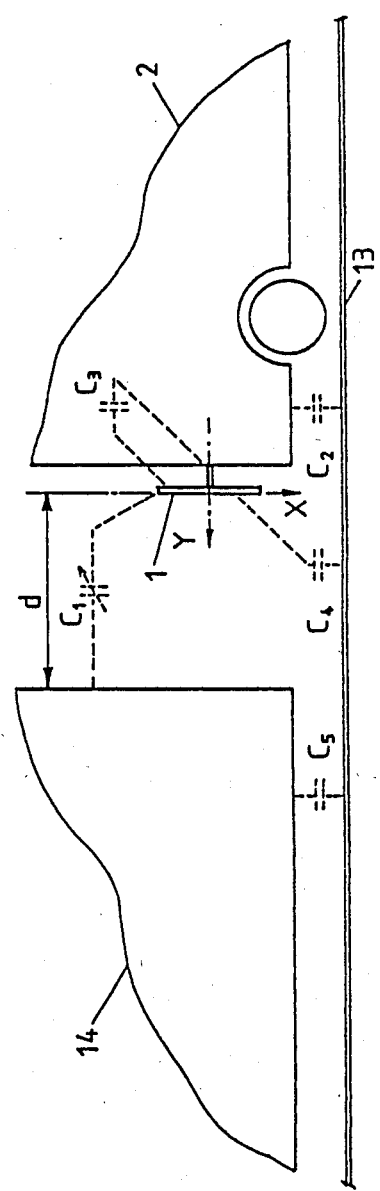
FIG. 3b is a diagrammatic side elevational view showing the geometic and capacitive relationship between the capacitor plate and its environment.
Figure 3A:
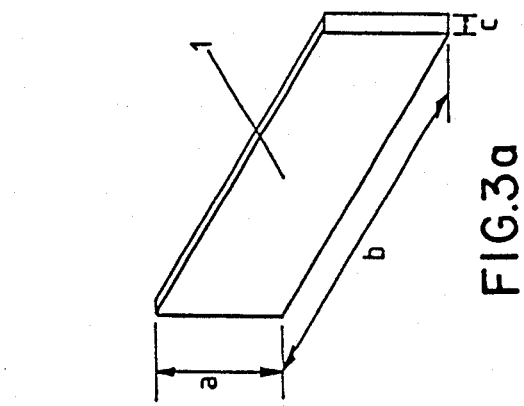
FIG. 3a is a perspective view of a capacitor plate of the proximity sensor of the present invention.

Before the function of the circuitry is explained, attention is directed to FIGS. 3a and 3b. The capacitor plate 1 consisting, e.g., of the number plate, has a height a, a length b and a thickness c. If the plate member 1 is mounted as shown in FIGS. 3b and 3c the plate member will face the ground 13 with an area $X = b \times c$ and has a rear (or front) area $Y = a \times b$ facing an obstacle 14. Owing to the relatively small thickness c of the plate member 1 the area Y is much larger than the area X which faces the ground 13.

As the plate member 1 approaches an obstacle 14, e.g., another motor vehicle, which is spaced a distance d apart, the capacitance $C_1$ existing between the plate member 1 and the obstacle 14 changes greatly. A capacitance $C_2$ exists between the motor vehicle 2 and the ground 13 and a relatively high capacitance $C_3$ exists between the plate member 1 and the motor vehicle 2. An undesired parasitic capacitance $C_4$ exists between the plate member 1 and the ground and has a value which depends on the ground clearance of the motor vehicle 2. A coupling capacitance $C_5$ may exist between the obstacle 14 and the ground 13. A change of the distance d will not change or will only slightly change the capacitances $C_2$, $C_3$, $C_4$ and $C_5$. The capacitance $C_1$ to be measured depends directly on the distance d.

The proximity sensor in accordance with the invention operates as follows. During the normal operation of the motor vehicle the switch 10 remains closed so that the measuring device 5 delivers a continually changing pick-up signal $s_c$, but the output signal $s_A$ of the amplifier 6 will remain unchanged. The actual value of the degenerative feedback signal, e.g., the deviation, is stored in the storage device 11, which consists, e.g., of a storage capacitor.

Figure 4:
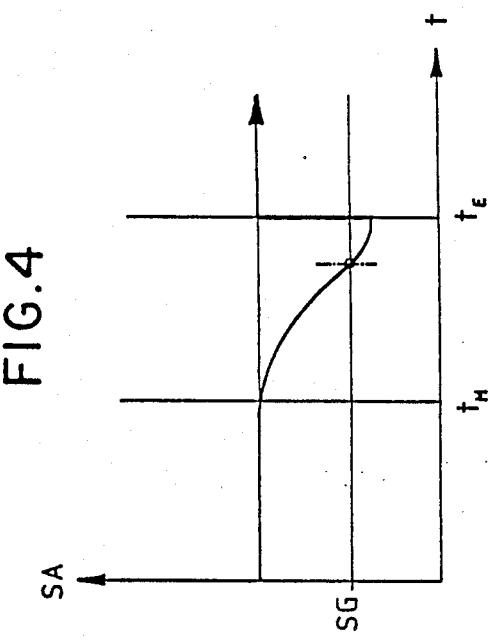
FIG. 4 is a graph illustrating the change of the output signal of the proximity sensor relative to time before and during a measuring operation.

When the proximity sensor is to be operated, e.g., because the vehicle is to be parked, the switch 10 is opened so that the degenerative feedback loop is interrupted. This may be effected, e.g., by a switch for the reversing light when the reverse gear is to be engaged, or in response to a direct command of the driver. At that time the output signal $s_A$ will not yet change because the last value which has been stored in the storage device 11 is applied to the degenerative feedback input terminal of the amplifier 6. But any subsequent change of the capacitance detected at the plate 1, e.g., in response to the approach to an obstacle 14, will change the output signal $s_A$, as is shown in FIG. 4, in which $t_m$ designates the time at which the switch 10 is opened.

If a comparator 7 is provided, a change of the signal $s_A$ above or below the fixed limit signal $s_G$ will cause the indicator 8 to generate a signal by which the driver is informed that the distance from an obstacle is less than a predetermined value. When the switch 10 is closed (at the time $t_E$ in FIG. 4) the degenerative feedback control loop is closed and the sensor is ready for the next measurement.

The capacitance $C_3$ existing between the plate member 1 and the body of the vehicle 2 is of an order of 100 pF and the capacitance change to be detected, i.e., the change of the capacitance $C_1$, is of an order of 0.1 pF. Nevertheless the invention permits a reliable evaluation of that change. It is essential that the measuring operation is performed only during the short time required to park the vehicle so that the effect of long-time changes of the other capacitance, particularly of the capacitances $C_2$ and $C_3$, will be negligible. For instance, the number plate 1 may be deformed so as to change the capacitance $C_3$ and a higher load on the vehicle may increase the capacitance $C_2$ but said changes will not adversely affect the the utility of the sensor.

The circuit of FIG. 2 is shown in more detail in FIG. 5 and will now be described with reference thereto. The measuring device 5 comprises a resistor $R_1$, which is connected at one end to a d.c. source and is connected at its other end to the fixed plate member 1. The capacitor $C_1$ is charged via the resistor $R_1$ until the Schmitt trigger controlled via $R_2$ is triggered in response to a voltage that is determined by the resistors $R_2$ and $R_3$. Thereafter, $C_1$ is discharged via the diode $D_1$. It is apparent that the pick-up signal $s_c$ has a varying duty factor, which depends on the capacitance of the capacitor $C_1$.

The amplifier 6 includes an operational amplifier $OP_1$ and an integrating resistance-capacitance circuit $C_6$, $R_6$. The gain depends on the resistances $R_4$ and $R_6$. The output signal $s_A$ of the amplifier is a voltage that depends on the duty factor of the signal $s_c$.

The output signal $s_A$ is delivered via the controlled witch 10 to a storage device 11 and is specifically delivered to the inverting input terminal of an operational amplifier $OP_3$. A reference voltage $U_{ref}$ is applied to the non-inverting input terminal. The output terminal of the amplifier is connected to its inverting input terminal via a capacitor $C_8$. The voltage across said capacitor $C_8$ represents the deviation, i.e., that voltage which when delivered via $R_5$ to the amplifier $OP_1$ will adjust the latter to a state in which a constant output signal $s_A$ is delivered. A reference voltage $U_{ref}$ is applied via the resistance-capacitance circuit $R_7$, $C_7$ to the non-inverting input terminal of the amplifier $OP_1$.

When the switch $S_1$ in the actuating device 12, i.e., in the present case the switch for the reversing lights, is closed, voltage from the car battery B is applied to the reversing lights $R_y$ and causes the controlled switch $S_2$ to be opened.

The comparator 7 comprises an amplifier $OP_2$ having an inverting input terminal which receives the signal $s_4$. In the amplifier $OP_2$ the signal $s_4$ is compared with a limit voltage $S_G$ that is applied to the non-inverting input terminal of the amplifier $OP_2$ and can be adjusted by means of a potentiometer $P_1$.

The output signal of the comparator 7 operates a controlled switch $S_3$ of the indicator so that, e.g., an audiofrequency generator G is connected to a speaker L or, as indicated by dotted lines, an indicating lamp $L_4$ is connected to a voltage source.

The circuit shown in FIG. 5 is merely an illustrative embodiment of the invention, which can be reduced to practice in other ways by the use of known electronic subassemblies and/or of microcomputers and suitable software.

I claim:

1. A capacitive proximity sensor assembly for motor vehicles comprising: at least one capacitor plate which is fixed to a motor vehicle; means for measuring the capacitance existing between said at least one capacitor plate and the environment, the capacitance changing when the capacitor plate on the vehicle comes close to an object; said measuring means comprising a measuring device for measuring the capacitance of said capacitor plate against the environment; a differential amplifier; said measuring device having an input coupled to said at least one capacitor plate and an output coupled to one input of said differential amplifier; said differential amplifier having a degenerative feedback control loop comprising a storage device and a switch all coupled in series with an output of said differential amplifier and another input of said differential amplifier, such storage device being provided for storing an instantaneous degenerative feedback signal so that when said switch is opened, the difference between said feedback signal and the capacitance being sensed generates an output signal; a comparator; said output of said differential amplifier being coupled to one input of said comparator; an indicator for indicating that the capacitor plate is close to an object; an output of said comparator being coupled to said indicator; another input of said comparator being coupled to a reference signal; and control means for controlling opening and closing of said switch.

2. The capacitive proximity sensor assembly of claim 1 wherein said fixed capacitor plate comprises a plate member which is mounted on the body of the vehicle.

3. The capacitive proximity sensor assembly of claim 2 wherein said plate member is a license number plate.

4. The capacitive proximity sensor assembly of claim 1 wherein said fixed capacitor plate comprises a conductive layer provided on the front or rear surface of a plate member fixed to the motor vehicle.

5. The capacitive proximity sensor assembly of claim 4 wherein said plate member is a license number plate.

6. The capacitive proximity sensor assembly of claim 1 wherein said control means is associated with the reverse gear for the vehicle and is operable to cause opening of the switch when the vehicle is in reverse gear and closing of the switch when the vehicle is in a different gear.

* * * * *